United States Patent
Yamamoto

(10) Patent No.: US 6,496,768 B2
(45) Date of Patent: Dec. 17, 2002

(54) VEHICULAR BRAKE CONTROL APPARATUS AND CONTROL METHOD THEREFOR

(75) Inventor: Takayuki Yamamoto, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 12 days.

(21) Appl. No.: 09/921,918

(22) Filed: Aug. 6, 2001

(65) Prior Publication Data

US 2002/0026272 A1 Feb. 28, 2002

(30) Foreign Application Priority Data

Aug. 29, 2000 (JP) .......................................... 2000-259850

(51) Int. Cl.[7] ................. B60T 8/00; B60T 7/12
(52) U.S. Cl. ................. 701/70; 701/78; 303/166; 303/115.2; 303/20
(58) Field of Search ................. 701/70, 78, 83; 303/166, 115.2, 115.4, 119.1, 20

(56) References Cited

U.S. PATENT DOCUMENTS 5,281,009 A * 1/1994 Kidston et al. .............. 303/162
5,366,281 A * 11/1994 Littlejohn ..................... 303/3

FOREIGN PATENT DOCUMENTS

| JP | 63-266228 | 11/1988 |
| JP | 11-165620 | 6/1999 |
| JP | 2000-18293 | 1/2000 |
| JP | 2000-46082 | 2/2000 |

* cited by examiner

*Primary Examiner*—Tan Q. Nguyen
(74) *Attorney, Agent, or Firm*—Kenyon & Kenyon

(57) ABSTRACT

A brake control apparatus has a braking member that is disposed so as to have a clearance with respect to a braked member that rotates together with a wheel, an electric motor that moves the braking member into contact with the braked member and then generates force for pressing the braking member against the braked member, and control means for controlling the force generated by the electric motor based on operation of a brake-operating pedal or the like. The control means detects a state of operation of the vehicle, and controls the force generated by the electric motor so that the speed of the braking member moving toward the braked member is changed in accordance with the operating state of the vehicle. For example, when the vehicle speed is high, the speed of the electric motor is increased to secure good braking responsiveness, and when the vehicle speed is low, the speed of the electric motor is decreased to reduce noises.

19 Claims, 4 Drawing Sheets

VEHICULAR BRAKE CONTROL APPARATUS AND CONTROL METHOD THEREFOR

The disclosure of Japanese Patent Application No.2000-259850 filed on Aug. 29, 2000 including the specification, drawings and abstract is incorporated herein by reference in its entirety.

BACKGROUND OF THE INVENTION

1. Field of the Invention

The invention relates to a vehicular brake control apparatus which includes a braked member rotatable together with a wheel, a braking member disposed so as to have a clearance with respect to the braked member, and an actuator that moves the braking member into contact with the braked member, and that then pressurizes the braking member, and which controls the actuator. The invention also relates to a control method for the vehicular brake control apparatus.

2. Description of the Related Art

The aforementioned type of apparatus is disclosed in, for example, Japanese Patent Application Laid-Open No. 2000-46082. The disclosed apparatus converts a rotating movement of an electric motor into a linear movement and, due to the linear movement, presses a pad, that is, a braking member, to a disc rotor, that is, a braked member, so as to generate braking force. Furthermore, this apparatus changes the clearance between the pad and the disc rotor in accordance with the state of running of the vehicle so as to improve the responsiveness during an early period of braking and reduce the noises produced when the pad is pressed against the disc rotor.

However, the above-described related art does not change the speed of the pad moving over the clearance. In some cases, therefore, the art may cause the pad to strongly strike the disc rotor, thereby producing a shock on the vehicle in some cases. Furthermore, if the actuator is an electric actuator such as an electric motor or the like, it is conceivable that the noise caused by the driving of the actuator will be great. This problem can be solved by reducing the moving speed of the pad (the driving speed of the electric actuator). However, the reduction of the moving speed of the pad is expected to involve a reduction in the braking responsiveness.

SUMMARY OF THE INVENTION

It is an object of the invention to provide a vehicular brake control apparatus that achieves good braking responsiveness of a vehicle and good reduction of the noise produced during braking, and a control method of the apparatus.

One aspect of the invention is a vehicular brake control apparatus including a braking member disposed so as to have a clearance with respect to a braked member that rotates together with a wheel, an actuator that moves the braking member into contact with the braked member and then generates a force for pressing the braking member against the braked member, an actuator control device that controls the force generated by the actuator based on a brake operation performed by an operating person, an operation state detecting device that detects a state of operation of a vehicle, and a moving speed changing device that changes a control performed by the actuator control device so that a speed of the braking member moving toward the braked member is changed in accordance with the state of operation detected by the operation state detecting device.

According to the above-described apparatus, the braking member is moved by the force generated by the actuator until it contacts the braked member. During the movement of the braking member, the moving speed changing means changes the speed of the braking member moving toward the braked member by changing the control performed by the actuator control device to control the force generated by the actuator in accordance with the state of operation of the vehicle, for example, the magnitude of the vehicle speed, the presence/absence of a parking brake operation request, etc. Therefore, during a predetermined state of operation of the vehicle, the speed of the braking member is increased to maintain good initial braking responsiveness. Furthermore, during a difference state of operation, the speed of the braking member is reduced to reduce the noises related to braking operation. Hence, it is possible to provide a vehicular brake control apparatus wherein the braking responsiveness is good and noises that irritate an operating person are not caused by braking.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

A preferred embodiment of the vehicular brake control apparatus the invention will be described hereinafter with reference to the accompanying drawings.

Figure 1:
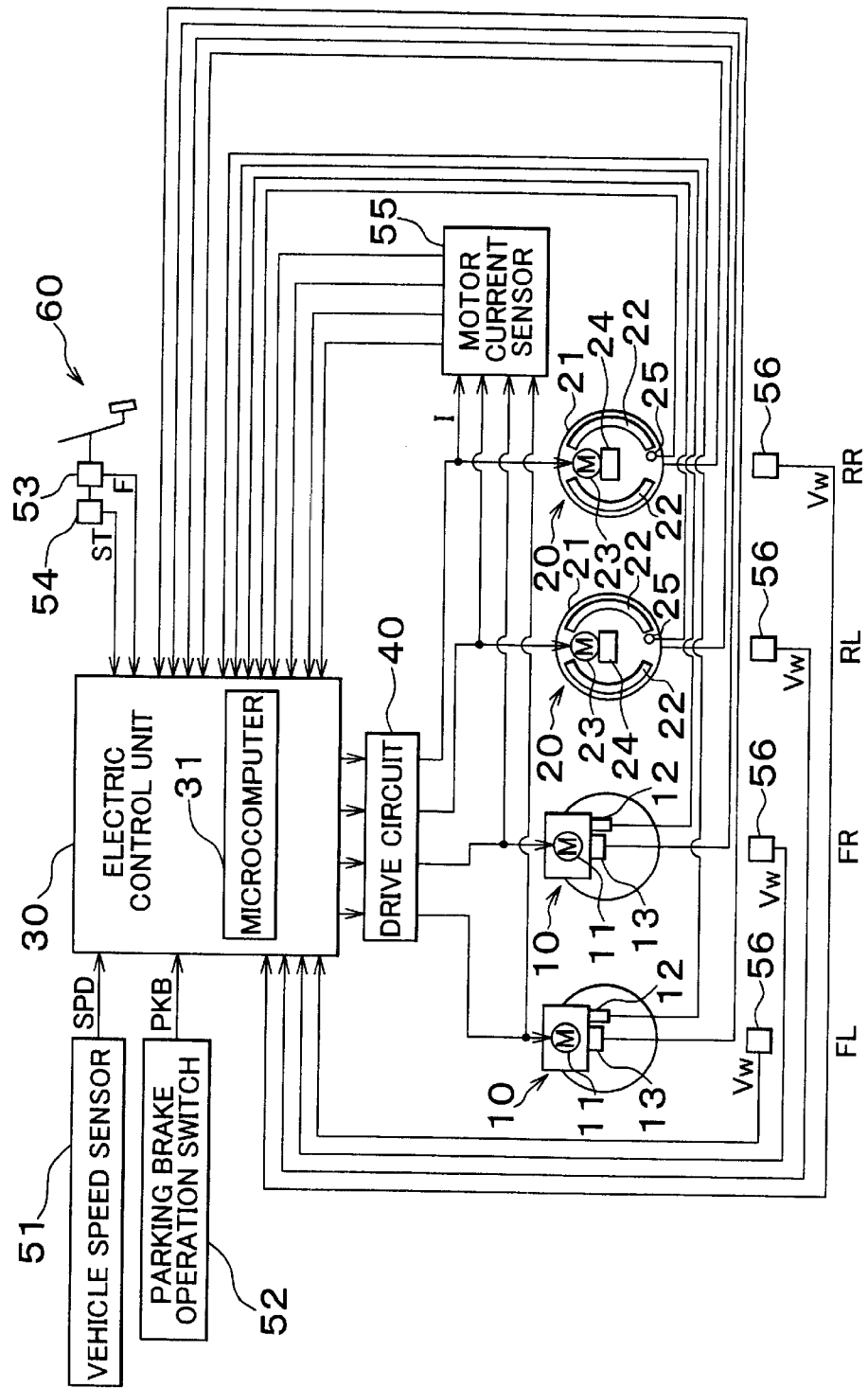
FIG. 1 is a diagram of an overall construction of an electric brake apparatus that includes a vehicular brake control apparatus in accordance with an embodiment of the invention.

FIG. 1 illustrates an overall construction of an electric brake apparatus that includes a vehicular brake control apparatus as mentioned above. The electric brake apparatus includes electric disc brakes 10 provided for right and left front wheels FR, FL, electric drum brakes 20 provided for right and left rearwheels RR, RL, an electric control unit 30, a drive circuit 40, and a brake pedal 60 provided as a brake operating member for a service brake.

Each electric disc brake 10 includes a disc rotor (not shown), that is, a braked member that rotates together with a corresponding one of the wheels, and a brake pad (not shown), that is, a braking member, which is retained unrotatably by a mounting bracket that is a vehicle body-side member, and which is disposed so as to form a predetermined clearance (interval) with respect to the disc rotor, as well as a direct-current electric motor 11 that forms an electric actuator for producing force (operating force) corresponding to the current supplied thereto, a position sensor 12 for detecting the position X of the braking member, and a pressurizing force sensor 13. Each electric disc brake 10 is designed to produce braking force that reduces rotation of the wheel by moving the brake pad into contact with the disc rotor and then pressing the brake pad against the disc rotor due to the actuating force produced by the direct-current electric motor 11.

The position sensor 12 is designed to detect the position X of the braking member driven via the direct-current electric motor 11 by detecting the rotational position of the direct-current electric motor 11. The pressurizing force sensor 13 is formed by a strain sensor mounted on a member that is pressed by a force equal to the force whereby the brake pad is actually pressed against the disc rotor. From the amount of strain detected by the strain sensor, an actual pressurizing force P is detected.

Each electric drum brake 20 includes a drum 21, that is, a braked member rotatable together with a corresponding one of the wheels, brake shoes 22, that is, braking members which are unrotatably retained by a backing plate that is a vehicle body-side member, and which are disposed so as to form a predetermined clearance with respect to the drum 21, a direct-current electric motor 23 for producing force (operating force) corresponding to the current supplied, a position sensor 24 for detecting the position X of the brake shoes 22, and a pressurizing force sensor 25. Each electric drum brake 20 is designed to produce braking force that reduces rotation of the wheel by moving the brake shoes 22 into contact with an inner peripheral surface of the drum 21 and then pressing the brake shoes 22 against the inner peripheral surface of the drum 21 due to the actuating force produced by the direct-current electric motor 23.

Figure 2:
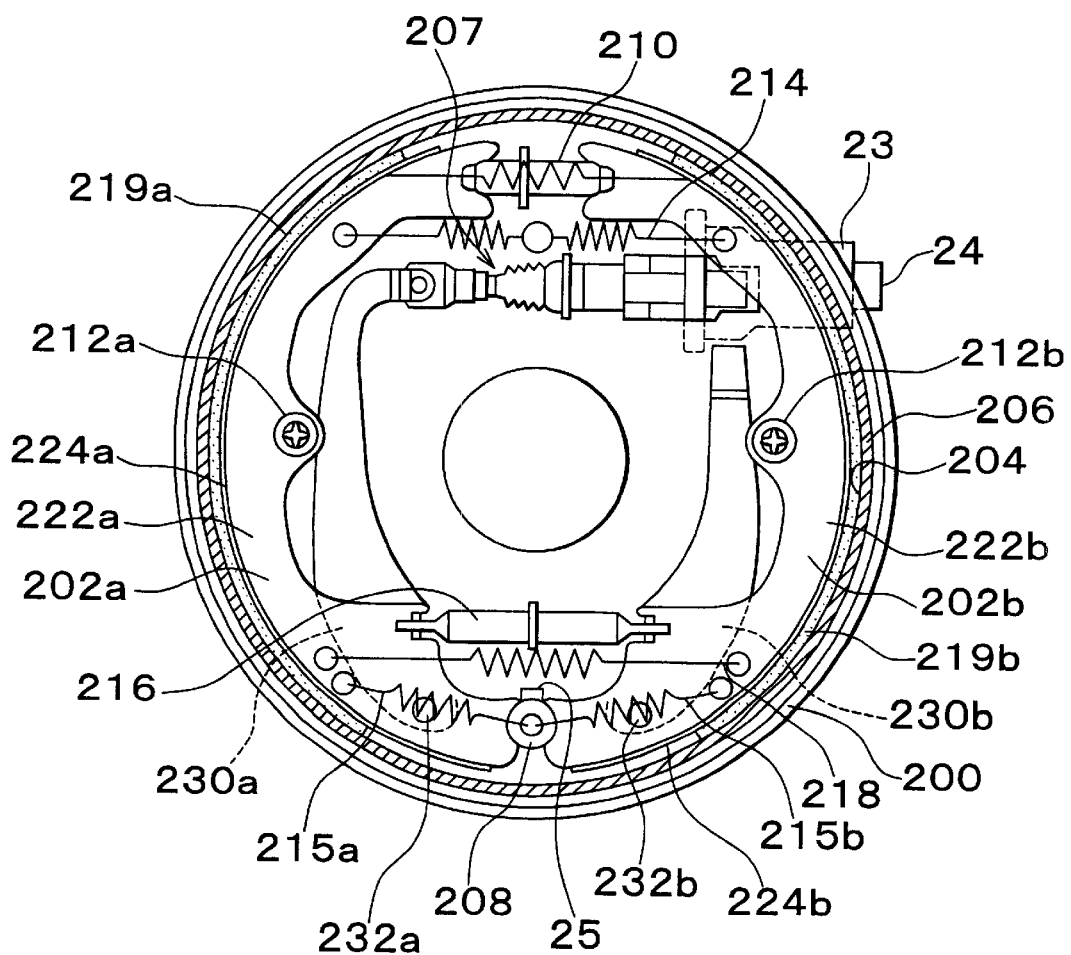
FIG. 2 is a sectional view of an electric drum brake incorporated in the electric brake apparatus shown in FIG. 1.

The electric drum brakes 20 are of a duo-servo type as illustrated in detail in FIG. 2. Each electric drum brake 20 includes a disc-shaped backing plate 200 that is unrotatably attached to a vehicle body-side member (not shown), a pair of generally arc-shaped brake shoes 202a, 202b (indicated by reference numeral 22 in FIG. 1) provided on the backing plate 200, a drum 206 (indicated by reference numeral 21 in FIG. 1) that has, on its inner peripheral surface, a friction surface 204 and that rotates together with the wheel, and an electric actuator 207 that expands the interval between end portions of the two shoes 202a, 202b.

First end portions of the brake shoes 202a, 202b that face each other are engaged with an anchor pin 208 fixed to the backing plate 200 so that the shoes 202a, 202b are retained pivotably but are prevented from turning together with the drum 206.

Second end portions of the shoes 202a, 202b are interconnected by a strut 210. The strut 210 transfers force acting on one of the shoes to the other shoe. The brake shoes 202a, 202b can be slid along the surface of the backing plate 200 due to shoe hold-down devices 212a, 212b, respectively.

The second end portions of the two brake shoes 202a, 202b are urged by a spring 214 in such directions as to move closer to each other as shown in FIG. 2. The first end portions of the shoes 202a, 202b are urged by shoe return springs 215a, 215b, respectively, toward the anchor pin 208. A strut 216 and a return spring 218 are also provided on the first end portions of the shoes 202a, 202b.

Braking linings 219a, 219b, that is, friction engagement members, are retained on outer peripheral surfaces of the brake shoes 202a, 202b. The two brake linings 219a, 219b are brought into friction engagement with an inner peripheral surface 204 of the drum 206 so that friction force is produced between the brake linings 219a, 219b and the drum 206. In this embodiment, the strut 210 has an adjustor mechanism that adjusts the clearance between the drum inner peripheral surface 204 and the brake linings 219a, 219b in accordance with the abrasion of the brake linings 219a, 219b.

The brake shoes 202a, 202b include rims 224a, 224b and webs 222a, 222b, respectively. Levers 230a, 230b are pivotably connected at their first end portions to the webs 222a, 222b, via pins 232a, 232b, respectively. Portions of the levers 230a, 230b and portions of the webs 222a, 222b that face each other have cutouts. The strut 216 is engaged with the cutouts.

The electric actuator 207, including the electric motor 23, is connected to a second end portion of the lever 230a. When the brake pedal 40 for the service brake purpose is operated, the lever 230a is turned due to the driving of the electric motor 23 (electric actuator 207) so that the brake shoes 202a, 202b are expanded or moved away from each other by the strut 216. Thus, the friction engagement members (brake linings 219a, 219b) are pressed against the inner peripheral surface 204 of the drum 206. That is, the friction engagement members are brought into friction engagement with the inner peripheral surface 204 so as to produce a friction force there between and thereby retard rotation of the wheel. Thus, a braking torque T is applied to the wheel.

The drag force based on the friction produced on one of the two shoes, for example, the shoe 202b, and the brake actuating force D caused by the electric actuator 207 (which can be considered an expansion force for expanding the two shoes 202a, 202b) are transferred from the second end portion of the shoe 202b to the second end portion of the other shoe 202a via the strut 210. As a result, the other shoe 202a is pressed against the drum inner peripheral surface 204 by the sum of the drag force and the expansion force, so that the shoe 202a produces a friction that is greater than the friction produced by the shoe 202b. Thus, the output from one shoe 202b becomes the input to the other shoe 202a, and furthermore, a double servo effect is achieved. In this manner, the duo-servo type drum brake is able to produce great braking torque.

The anchor pin 208 is provided with a pressurizing force sensor 25, more specifically, a stain sensor for detecting the load applied to the anchor pin 208. As mentioned above, in the duo-serve type drum brake 20, the drag force based on friction and the expansion force produced by the electric actuator 207, when such forces occur on one of the shoes, are transferred to the other shoe, so that the other shoe is pressed against the drum 206 by the sum of the drag force and the expansion force. Due to the servo effect of the other shoe, the force transferred to that shoe via the strut 210 is further amplified, and then acts on the anchor pin 208. Therefore, by determining a braking torque based on the load applied to the anchor pin 208, the braking torque T produced by the duo-serve type electric drum brake 20 can be detected. The braking torque T is equivalent to the force (actual pressurizing force P) whereby the brake shoes 202a, 202b (brake linings 219a, 219b), that is, braking members, are pressed against the drum 206, that is, a braked member, as long as the wheel is rotating.

The electric actuator 207 includes a speed reducer and a ball screw mechanism (motion conversion mechanism), besides the electric motor 23. Rotation of an output shaft of the electric motor 23 is reduced in speed by the speed reducer. The speed-reduced rotational motion is converted into linear motion by the ball screw mechanism. The linear motion is transferred to the lever 230a connected to an output member of the ball screw mechanism. The position sensor 24 is provided within the electric motor 23, and is designed to detect the position X of the shoe 202a (202b) by detecting the rotational position of the electric motor 23. The position X of the shoe 202a (202b) may also be directly detected by a gap sensor or the like that is fixed to the backing plate 200 or the like.

Referring back to FIG. 1, the electric control unit 30 includes a microcomputer 31. The microcomputer 31 has a memory and a CPU (which are not shown), and executes programs stored in the memory. The electric control unit 30 is connected to the position sensors 12, 24, the pressurizing force sensors 13, 25, a vehicle speed sensor 51 for detecting the speed of the vehicle (hereinafter, referred to as "vehicle speed") SPD by detecting rotation of an output shaft of a transmission (not shown), a parking brake operation switch 52 that is operated by an operating person so as to control the operation of the parking brake and that generates a parking brake command signal PKG, and a depressing force sensor 53 for detecting a pedal depressing force F that is applied to the brake pedal 60 by an operating person, a stroke sensor 54 for detecting an operation stroke ST of the brake pedal 60, a motor current sensor 55, and wheel speed sensors 56 provided separately for the individual wheels FR, FL, RR, RL for detecting the wheel speeds Vw of the wheels. Signals are inputted from these components to the electric control unit 30.

The drive circuit 40 is a switching circuit that is connected at an input side and an output side thereof to the electric control unit 30 and the electric motors 11, 23. The drive circuit 40 is also connected to a battery of the vehicle (not shown) provided as an electric power source. The drive circuit 40 supplies the electric motors 11, 23 with currents corresponding to the command signals indicating the duty ratio. The motor current sensor 55 is connected to current supplying lines extending between the drive circuit 40 and the electric motors 11, 23. The motor current sensor 55 is connected to the electric control unit 30, and is designed so as to detect an actually supplied current I (obtained by taking the duty ratio into account) that is actually supplied to the electric motors 11, 23, and so as to deliver the detected actually supplied current I to the electric control unit 30. The actually supplied current I represents a value that is approximate to the force generated by the electric motors 11, 23 (actual brake operation force).

Figure 3:
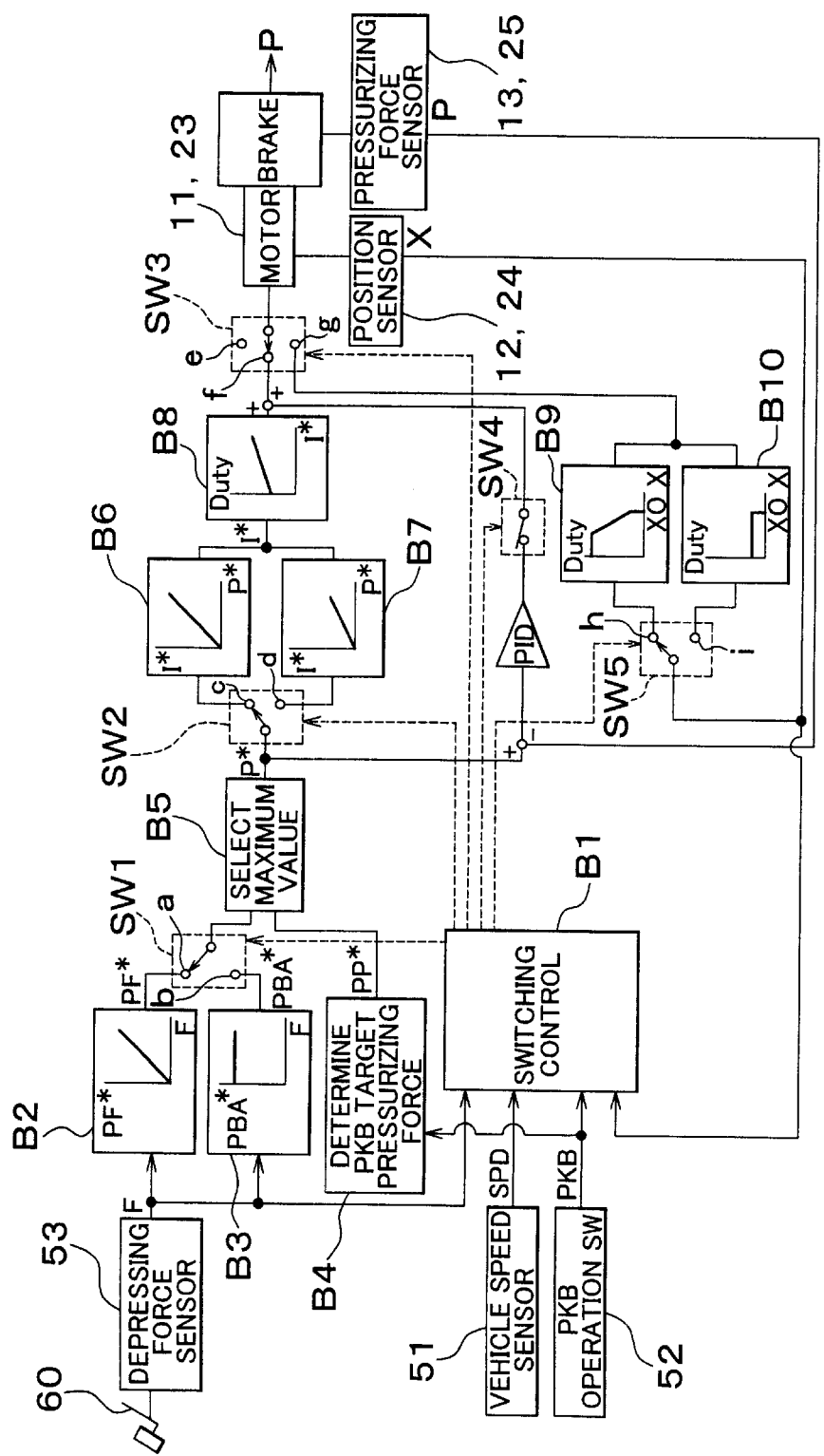
FIG. 3 is a functional block diagram of a program executed by a microcomputer shown in FIG. 1.
Figure 4:
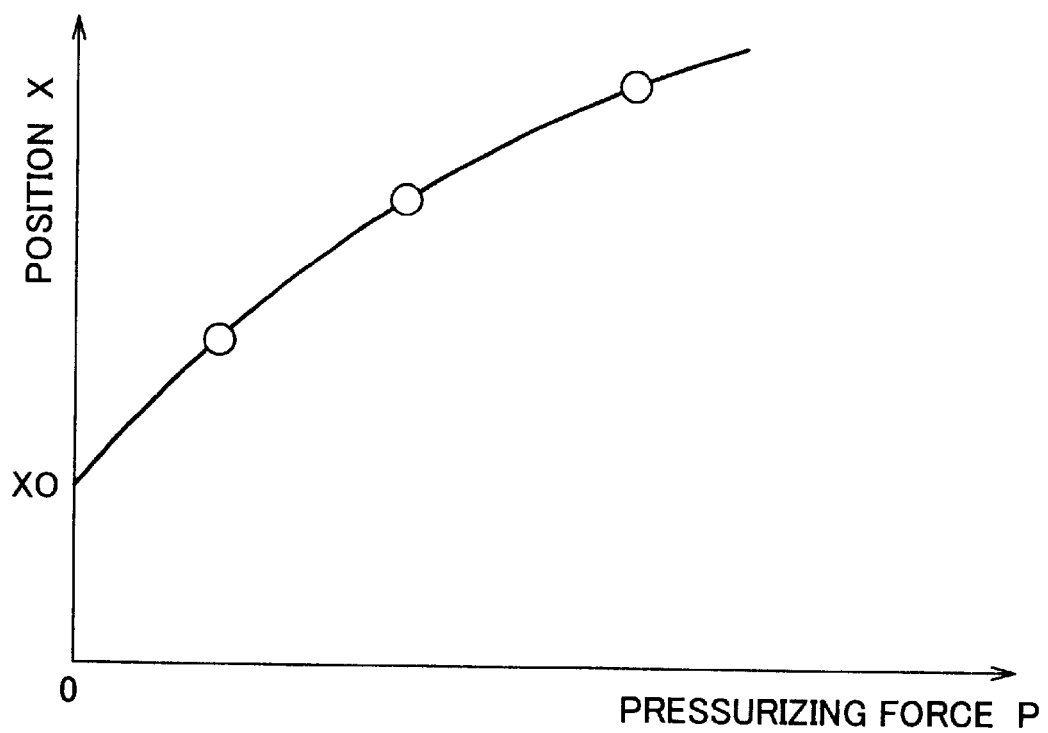
FIG. 4 is a diagram indicating a relationship between the position of a braking member and the pressurizing force in the electric brake apparatus.

Next, operation of the above-described vehicular brake control apparatus will be described. FIG. 3 illustrates an operation of a program executed by the microcomputer 31 in a function block diagram. To facilitate the understanding, FIG. 3 also shows components other than the program (e.g., the electric motors 11, 23, the brake, the brake pedal 60, and various sensors such as the depressing force sensor 53 and the like).

The microcomputer 31 determines the state of operation of the vehicle in a block B1. Based on the result of the determination, the microcomputer 31 operates switches SW1 to SW5, thereby performing brake controls in various manners. First, if during the running of the vehicle, an operating person depresses the brake pedal 60 to reduce the vehicle speed, the depressing force sensor 53 generates a pedal depressing force F. In the block B1, the microcomputer 31 also inputs the pedal depressing force F, and determines whether there is an emergency braking request based on the pedal depressing force F. More specifically, an emergency braking request occurs when the brake pedal 60 is depressed strongly and suddenly. Therefore, the microcomputer 31 determines whether the pedal depressing force F is greater than a predetermined threshold Th, and determines whether the time differential value (dF/dt) of the pedal depressing force F is greater than a predetermined threshold dTh. If the two conditions are met, the microcomputer 31 determines that there is an emergency braking request.

If the microcomputer 31 determines that the emergency braking request has not been made but a merely ordinary braking request has been made, the microcomputer 31 connects a movable contact of the switch SW1 to a stationary contact a. Then, based on the detected pedal depressing force F and a table stored in the memory and indicated in a block B2, the microcomputer 31 determines a (ordinary operation-time) service brake target pressurizing force PF*. The table indicated in the block B2 is a table that prescribes a relationship between the pedal depressing force F and the service brake target pressurizing force PF* in which the pedal depressing force F and the service brake target pressurizing force PF* have a substantially proportional relationship.

Conversely, if the microcomputer 31 determines that the emergency braking request has been made, the microcomputer 31 connects the movable contact of the switch SW1 to a stationary contact b. Then, based on the detected pedal depressing force F and a table stored in the memory and indicated in a block B3, the microcomputer 31 determines an emergency braking-time target pressurizing force PBA*. The table indicated in the block B3 prescribes a relationship between the pedal depressing force F and the emergency braking-time target pressurizing force PBA*. According to the table in the block B3, the emergency braking-time target pressurizing force PBA* remains substantially fixed regardless of the pedal depressing force F, and has a value that is substantially equal to the maximum value of the ordinary operation-time service brake target pressurizing force PF*. The purpose of setting the value of the emergency braking-time target pressurizing force PBA* substantially equal to the maximum value of the ordinary operation-time service brake target pressurizing force PF* is to generate a great braking force in response to the emergency braking request even if the actual pedal depressing force F decreases.

The microcomputer 31 also determines a parking brake target pressurizing force PP* in a block B4. That is, when the parking brake operation switch 52 is operated so that a request to actuate the parking brake, the microcomputer 31 sets the parking brake target pressurizing force PP* to a predetermined value (e.g., a constant value other than "0"). When the request to actuate the parking brake is discontinued by operating the parking brake operation switch 52, the microcomputer 31 sets the parking brake target pressurizing force PP* to "0".

Subsequently in a block B5, the microcomputer 31 selects the pressurizing force having a maximum value (great value) from the service brake target pressurizing force PF* or the emergency braking-time target pressurizing force PBA* determined as described above, and the parking brake target pressurizing force PP*, and then sets the selected pressurizing force as a target pressurizing force P*.

Furthermore, in the block B1, the microcomputer 31 determines whether the actual vehicle speed SPD detected by the vehicle speed sensor 51 is greater than a predetermined reference vehicle speed SPDK. If the microcomputer 31 determines that the vehicle speed SPD is greater than the predetermined reference vehicle speed SPDK, the microcomputer 31 connects the movable contact of a switch SW2 to a stationary contact c. Then, based on a table stored in the memory and indicated in a block B6 and the target pressurizing force P* determined in the block B5, the microcomputer 31 determines a supply current I*. Furthermore, if the microcomputer 31 determines that the emergency braking request has been made, the microcomputer 31 connects the movable contact of the switch SW2 to the stationary contact c. Then, based on the table indicated in the block B6 and the target pressurizing force P*, the microcomputer 31 determines the supply current I*. The table indicated in the block B6 prescribes a relationship between the target pressurizing force P* and the supply current I*. In this example, the target pressurizing force P* and the supply current I* have a substantially proportional relationship.

Conversely, if the microcomputer 31 determines that the actual vehicle speed SPD is less than the predetermined reference vehicle speed SPDK, the microcomputer 31 connects the movable contact of the switch SW2 to a stationary contact d. Then, based on a table stored in the memory and indicated in a block B7 and the target pressurizing force P* determined in the block B5, the microcomputer 31 determines the supply current I*. Furthermore, if there is a request to actuate the parking brake, the microcomputer 31 also connects the movable contact of the switch SW2 to the stationary contact d, so that the supply current I* is determined based on the table indicated in the block B7 and the target pressurizing force P* determined in the block B5. Similar to the table indicated in the block B6, the table indicated in the block B7 prescribes a relationship between the target pressurizing force P* and the supply current I*. In this case, too, the target pressurizing force P* and the supply current I* have a substantially proportional relationship. The table indicated in the block B7 provides a smaller supply current I* than the table indicated in block B6, with respect to any given target pressurizing force P*. If a situation in which the movable contact of the switch SW2 should be connected to the stationary contact c and a situation in which the movable contact of the switch SW2 should be connected to the stationary contact d simultaneously occur, the movable contact is connected to the stationary contact c.

A reason for selecting one of the block B6 and the block B7 in accordance with the magnitude of the vehicle speed SPD is as follows. When the vehicle speed SPD is greater than the predetermined reference vehicle speed SPDK or when the emergency braking request is made, the braking responsiveness should be regarded more important than shocks caused on the vehicle at the time of start of the braking (a time point at which the braking member contacts the braked member) and noises produced by the electric motors 11, 23 and by the speed reducer, the ball screw mechanism, etc., that turn together with the output shafts of the electric motors 11, 23, and therefore the braking member should be moved fast to the braked member. Furthermore, when the vehicle speed SPD is less than the predetermined reference vehicle speed SPDK or when the parking brake actuation request is made, the braking responsiveness requirement is not very high. In this case, therefore, the braking member should be gently moved in order to reduce the noises produced by the electric motors 11, 23 and the like and the shocks caused on the vehicle at the time of start of the braking.

Subsequently, the microcomputer 31 determines a duty ratio Duty based on the supply current I* determined in the block B6 or B7 and a table stored in the memory and indicated in a block B8.

Furthermore, in the block B1, the microcomputer 31 determines whether there is a braking request. If it is determined that there is not any braking request, the microcomputer 31 connects the movable contact of a switch SW3 to a stationary contact e. More specifically, the microcomputer 31 determines whether the pedal depressing force F detected by the depressing force sensor 53 is greater than "0" and a request for actuation of the service brake is made, and whether a request for actuation of the parking brake is made by operating the parking brake operation switch 52. If it is determined that neither one of the requests has been made, the microcomputer 31 connects the movable contact of the switch SW3 to the stationary contact e, which is not connected to any one of the blocks. As a result, no current flows through the electric motor 11 or 23, so that the braking member is not pressed against the braked member.

The microcomputer 31 also determines in the block B1 whether the braking member is at a position where it is considered on a design basis that the braking member is in contact with and is pressed against the braked member, based on whether the position X of the braking member detected by the position sensor 12, 14 is greater than a reference position X0 at which the distance between the braking member and the braked member is considered on a design basis to be equal to "0". Then, if it is determined that the braking request (the service brake actuation request or the-parking brake actuation-request) has been outputted and that the position X of the braking member is greater than the reference position X0, the microcomputer 31 connects the movable contact of the switch SW3 to a stationary contact f. If it is determined that the position X of the braking member is less than the reference position X0, the microcomputer 31 connects the movable contact of the switch SW3 to a stationary contact g.

Thus, until the braking member contacts the braked member, the braking member is moved to the braked member by a feedback control based on the position X of the braking member (using the block B9 and the block B10). After the braking member contacts the braked member, braking force is provided by a feedback control based on the pressurizing force from the braking member to the braked member (using the block B6 and the block B7).

It should be noted herein that when the position X of the braking member is greater than the reference position X0, the braking member is in contact with the braked member, and that when the position X of the braking member is less than the reference position X0, the braking member is apart from the braked member.

Let it assumed herein that the movable contact of the change-over switch SW3 is connected to the stationary contact f. Then, a signal having the duty ratio Duty determined in the block B8 is given to the drive circuit 40 shown in FIG. 1, so that the current corresponding to the duty ratio Duty flows through the electric motor 11, 23. As a result, the braking member is pressed against the braked member by a pressurizing force P, so that a braking force is generated. Due to abrasion of the braking member or the like, however, there are cases where the braking member is apart from the braked member even though the position X of the braking member is at the reference position. In such a case, the moving speed of the braking member from the reference position X0 to the position of contact with the braked member (the speed of the braking member moving toward the braked member) can be changed in accordance with the state of operation (the magnitude of the vehicle speed, or the like) by selectively using the block B6 or the block B7.

The pressurizing force P is detected by the pressurizing force sensor 13, 25. However, the pressurizing force sensor 25 is a strain sensor attached to the anchor pin 208, and detects the actual braking torque T. Therefore, if the vehicle speed is "0" (including a case where the vehicle speed is substantially "0", for example, within a range of very low vehicle speed (5 km/h or the like) or less), the pressurizing force sensor 25 does not generate an output corresponding to the pressurizing force P. Each of the pressurizing force sensors 13, 25 becomes unable to accurately detect the pressurizing force P if the sensor has an abnormality.

Therefore, the microcomputer 31 determines in the block B1 whether the pressurizing force sensor 13, 25 is in a state of being capable of detecting the pressurizing force P. If it is determined that the sensor is in the state of being capable of detecting the pressurizing force P, the microcomputer 31 closes a switch SW4. Thus, the pressurizing force P is feedback-controlled, and the duty ratio Duty is changed so that the actual pressurizing force P approaches the target pressurizing force P*. In this case, since the pressurizing force sensor 25 detects the actual braking torque, the feedback control is performed so that the pressurizing force P becomes equal to the target pressurizing force P* at which the actual braking torque becomes equivalent to the target braking torque. Conversely, if the microcomputer 31 determines that the pressurizing force sensor 13, 25 is in a state in which the sensor cannot detect the pressurizing force P, the microcomputer 31 opens the switch SW4. Thus, the feedback control of the pressurizing force P based on an inaccurate value is prohibited.

The determination as to whether the pressurizing force sensor 13, 25 is in the state where the sensor cannot detect the pressurizing force P can be accomplished by determining whether the vehicle speed is "0". The determination as to whether the pressurizing force sensor 13, 25 is in an abnormal state where the-sensor is not.capable of detecting the pressurizing force P can be accomplished by determining whether the pressurizing force sensor 13, 25 generates an output-when the position X of the braking member becomes greater than the reference position X0 by a predetermined amount. In the feedback control, the duty ratio Duty may be determined based on a difference between the target-pressurizing force P* and the actual pressurizing force P, or based on a differential value of the difference, or based on an integral value of the difference, or based on at least two of the actual difference, the differential value of the difference, and the integral value of the difference.

The above-description is made in conjunction with the case where the movable contact of the switch SW3 is connected to the stationary contact f. If it is determined that the service brake actuation request or the parking brake actuation request has been made, and that the actual position X of the braking member detected by the position sensor 12, 24 is less than the reference position X0 (i.e., the brake actuation request has been made, but the braking member is apart from the braked member), the microcomputer 31 connects the movable contact of the switch SW3 to the stationary contact g.

If in this case, the microcomputer 31 also determines that the vehicle speed SPD is greater than the predetermined reference vehicle speed SPDK or that the emergency braking request has been made, the microcomputer 31 connects the movable contact of a switch SW5 to a stationary contact h. As a result, the microcomputer 31-determines a duty ratio Duty based on the actual position X of the braking member, with reference to a table which prescribes the duty ratio Duty and the position X of the braking member as indicated in a block B9 and which is stored in the memory.

The X-axis in each of the graphs shown in the blocks B9 and B10 indicates less values toward the left-side end of the axis, that is, indicates positions of the braking member farther apart from the braked member. In the graph of the block B9, the duty ratio Duty remains great in a certain range from the minimum value of the position X of the braking member. After that, the duty ratio Duty decreases as the position X approaches the position X0. Due to this setting, when the braking member is far apart from the braked member, the duty ratio Duty is set high to achieve a high speed of movement of the braking member toward the braked member. Furthermore, when the braking member is about to contact the braked member, the duty ratio Duty is reduced to reduce the moving sped of the braking member, so that the shock upon an impact of the braking member on the braked member is reduced.

Therefore, in the case where the brake actuation request has been made and the braking member is apart from the braked member (i.e., the movable contact of the switch SW3 is connected to the stationary contact g), and where the vehicle speed SPD is greater than the predetermined reference vehicle speed SPDK or the emergency braking request has been made, -a signal having the duty ratio Duty determined in the block B9 is given to the drive circuit 40 shown in FIG. 1. As a result, the current corresponding to the duty ratio Duty flows through the electric motor 11, 23, so that the braking member is pushed (moved) toward the braked member.

Conversely, if it is determined that the vehicle speed SPD is less than the predetermined reference vehicle speed SPDK or that the parking brake actuation request has been made, the microcomputer 31 connects the movable contact of the switch SW5 to a stationary contact i. As a result, the microcomputer 31 determines a duty ratio Duty based on the actual position X of the braking member, with reference to a table which prescribes the position X of the braking member and the duty ratio Duty as indicated in the block B10 and which is stored in the memory. The table indicated in the block B10 provides a smaller duty ratio Duty than the table indicated in the block B9, with respect to a given position X. If a situation in which the movable contact of the switch SW5 should be connected to the stationary contact h and a situation in which the movable contact of the switch SW5 should be connected to the stationary contact i simultaneously occur, the movable contact of the switch SW5 is connected to the stationary contact h.

Therefore, in the case where the brake actuation request exists and the braking member is apart from the braked member (i.e., the movable contact of- the switch SW3 is connected to the stationary contact g), and where the vehicle speed SPD is less than the predetermined reference vehicle speed SPDK or the parking brake actuation request exists, a signal having the duty ratio Duty determined in the block B10 is given to the drive circuit 40 shown in FIG. 1. Therefore, the current corresponding to the duty ratio Duty is caused to flow through the electric motor 11, 23, so that the braking member is pushed (moved) toward the braked member. As stated above, the duty ratio Duty determined from the table of the block B10 is smaller than the duty ratio Duty determined from the table of the block B9. Therefore, the moving speed of the braking member set in the case where it is determined that the vehicle speed SPD is less than the predetermined reference vehicle speed SPDK or that the parking brake actuation request exists is smaller than the moving speed of the braking member set in the case where it is determined that the vehicle speed SPD is greater than the redetermined reference vehicle speed SPDK or the emergency braking request exists.

The reason for selecting one of the block B9 and the block B10 in accordance with the magnitude of the vehicle speed SPD and the like is substantially the same as the reason for selecting one of the block B6 and the block B7. That is, when the vehicle speed SPD is greater than the predetermined reference vehicle speed SPDK or-when the emergency braking request is made, the braking responsiveness should be regarded more important than shocks caused in the vehicle at the time of start of the braking and noises produced by the electric motors 11, 23 and by the speed reducer, the ball screw mechanism, etc., that turn together with the output shafts of the electric motors 11, 23, and therefore the braking member should be moved fast toward the braked member. Furthermore, when the vehicle speed SPD is less than the predetermined reference vehicle speed SPDK or when the parking brake actuation request is made, the braking responsiveness requirement is not very severe. In this case, therefore, the braking member should be gently moved in order to reduce the noises produced by the electric motors 11, 23 and the like and the shocks caused in the vehicle at the time of start of the braking.

As described above, the brake control apparatus of this embodiment determines whether the present situation is a situation in which the braking responsiveness should be given high priority or a situation in which the noises produced by a braking operation should be reduced, based on the state of operation of the vehicle (whether the vehicle speed SPD is greater than the reference vehicle speed SPDK, whether the parking brake actuation request exists, whether the emergency braking request has been made, etc.). In accordance with the result of determination, suitable blocks are selected from the blocks B6, B7 and the blocks B9, B10 so as to change the current through the electric motor 11, 23, thereby changing the speed of movement of the braking member toward the braked member. Thus, the embodiment provides a brake control apparatus wherein the braking responsiveness is good and noises that irritate an operating person are not caused by braking. It should be noted herein that in the blocks B6-B7, a gain with respect to the target pressurizing force P* of a feed forward term in the feedback control of the pressurizing force P is changed in effect.

Furthermore, in the state of operation where the emergency braking request has been made, the brake control apparatus of the foregoing embodiment selects the block B3, and selects the block B6 regardless of the vehicle speed SPD, so as to move the braking member to the braked member in a short time. Therefore, the apparatus is able to perform braking with high responsiveness when the emergency braking request is made.

With regard to the brake control of the right and left rear wheels RR, RL in the foregoing embodiment, the actual braking torque T is detected by the pressurizing force sensor 25. Therefore, the actual braking torque can be controlled to a targeted value even if there is a change in the coefficient of friction between the inner peripheral surface of the drum 206 and the brake linings 219a, 219b provided as friction engagement members.

The invention is not limited to the foregoing embodiment, but various other modifications may be adopted within the scope of the invention. For example, although in the foregoing embodiment, the feedback control of the pressurizing force P is performed based on the pressurizing force P detected by the pressurizing force sensor 13, 25, the feedback control of the pressurizing force P may also be performed by assuming, as a pressurizing force P, a value proportional to the actually supplied current I detected by the motor current sensor 55.

Furthermore, in the foregoing embodiment, the table of the block B6 is selected when the vehicle speed SPD is greater than the reference vehicle speed SPDK, and the table of the block B7 is selected when the vehicle speed SPD is less than the reference vehicle speed SPDK. However, it is also possible to adopt a construction in which at least three tables that provide different supplied currents I with respect to a given target pressurizing force P* are prepared, and one of the table is selected in accordance with the vehicle speed SPD so that the moving speed of the braking member more continuously increases as the vehicle speed SPD increases. Similarly, instead of the binary selection between the block B9 and the block B10, it is also possible to adopt a construction in which at least three tables that provide different duty ratios Duty with respect to a given position X of the braking member, and one of the tables is selected in accordance with the vehicle speed SPD so that the moving speed of the braking member more continuously increases as the vehicle speed SPD increases.

The reference position X0 of the braking member may be a fixed value, or may also be changed as follows. That is, a point at which a pressurizing force sensor detects a pressurizing force is learned as a reference position, and the reference position X0 is updated for every braking operation or every several braking operations. In such a case, considering that in the-graph of the block B9, the reference position X0 shifts to the right along the X axis, it is also practicable to update the graph of the block B9 by extending the range over which the duty ratio Duty is at a high level to the right along the X axis by the same amount as the shift of the reference position X0, so that the entire graph is shifted to the right. Likewise, the graph of the block B10 may also be updated so that the entire graph of X vs. Duty is shifted to the right. Furthermore, it is also practicable to determine the aforementioned reference position X0 by sampling the output P of the pressurizing force sensor 13, 25 and the output X of the position sensor 12, 24, and extrapolating (estimating) an output X of the position sensor 12, 24 corresponding to the output "0" of the pressurizing force sensor 13, 25. Still further, although in the foregoing embodiment, the service brake target pressurizing force PF* is determined based on the pedal depressing force F, this manner of determination may be replaced by or supplemented with determination of the service brake target pressurizing force PF* based on the output of the stroke sensor 54 detecting the operation stroke ST of the brake pedal 60. It is also practicable to detect whether the present state is an emergency braking state from the operation stroke ST. Still further, the emergency braking state may be detected from the operation stroke ST and the vehicle speed. The emergency braking state may also be detected from the operation stroke ST and the speed of the operation stroke.

Furthermore, it is also practicable to adopt a construction in which when the braking member reaches the reference position X0 changed or determined as described above, the control of movement of the braking member is switched from the feedback control based on the position of the braking member to the feedback control based on the braking torque.

Still further, although in the foregoing embodiment, the power sources of the electric actuators are the direct-current electric motors 11, 13, the electric actuator power sources may also be ultrasonic motors for all the wheels, or ultrasonic motors for the front wheels and DC motors for the rear wheels, or DC motors for the front wheels and ultrasonic motors for the rear wheels.

Still further, each electric actuator may be of any type as long as a corresponding brake is actuated by the electric actuator pressing the braking member (friction engagement member) against the braked member. Therefore, it is also possible to adopt an actuator that includes a wheel cylinder and an electromagnetic control device that allows electrical control of the liquid pressure in the wheel cylinder. The brake provided for each wheel may be a disc brake or may also be a drum brake.

In the graph of the block B9 in the foregoing embodiment, the duty ratio Duty linearly decreases as the braking member approaches the reference position X0. However, the manner of decreasing does not need to be linear but may be any other manner as long as the duty ratio Duty decreases. For example, the duty ratio Duty may decrease in a quadratic curve manner. Furthermore, during a beginning period of movement of the braking member, the duty ratio Duty does not need to be kept constant.

Although in the foregoing embodiment, both the emergency braking and the vehicle speed are detected to change the moving speed of the braking member, the changing of the moving speed of the braking member may instead be performed based only on the emergency braking (that is, if the emergency braking state is detected, the speed of the braking member moving to the braked member is increased).

Furthermore, when a signal of braking with respect to the vehicle based on the parking brake is detected, the control of increasing the moving speed of the braking member may be prohibited. Still further, if the vehicle speed is at least a predetermined value (e.g., a high vehicle speed at which it is normally considered that an operating person does not engage the parking brake) though the signal of braking with respect to the vehicle based on the parking brake is detected, it is also practicable to increase the moving speed of the braking member instead of prohibiting the control of increasing the moving-speed of the braking member.

The operation of the parking brake includes an operation of an operating lever of the automatic transmission to a "P range" and the like, as well as the operations of a parking brake operating member and a parking switch.

The emergency braking may include an anti-lock brake control ABS, an acceleration slip control TRC, a vehicle stability control VSC, etc., as well as a brake assist control of producing a greater braking force than the braking performed upon an operation of the driving person.

The vehicle operation state detecting device includes sensors for detecting information regarding the vehicle operation, for example, the accelerator operation amount caused by the driving person, the amount of braking operation, the vehicle speed and the operation of the parking brake, and further includes sensors for detecting the wheel speed, the vehicle acceleration (the longitudinal acceleration and the transverse acceleration), the steering angle, the yaw rate, the distances from the vehicle to other vehicles or buildings and the like.

It is also possible to determine a state in which a braking force greater than normal is needed, a slipping wheel state, a vehicle behavior limit state and a reduction in the inter-vehicle distance as an emergency braking state based on at least one of signals from the sensors.

If it has been determined that the emergency braking state exists as mentioned above, it is also possible to change the moving speed of a braking member so as to give higher priority to the braking responsiveness than to the noise control as in the embodiment described above in conjunction with a vehicle speed greater than or equal to the predetermined value.

Still further, the electric control means 30 in the foregoing embodiment of the invention serves as an actuator control device, a moving speed changing device, a current control device, actuator control means and moving speed changing means in the invention.

What is claimed is:

1. A vehicular brake control apparatus comprising:
    a braking member disposed so as to have a clearance with respect to a braked member that rotates together with a wheel;
    an actuator that moves the braking member into contact with the braked member and then generates a force for pressing the braking member against the braked member;
    an actuator control device that controls the force generated by the actuator based on a brake operation performed by an operating person;
    an operation state detecting device that detects a state of operation of a vehicle; and
    a moving speed changing device that changes a control performed by the actuator control device so that a speed of the braking member moving toward the braked member is changed in accordance with the state of operation detected by the operation state detecting device.

2. A vehicular brake control apparatus according to claim 1,
    wherein the actuator includes an electric actuator that generates a force in accordance with a current supplied thereto, and
    wherein the actuator control device controls the current to be supplied to the electric actuator.

3. A vehicular brake control apparatus according to claim 1,
    wherein the operation state detecting device detects a speed of the vehicle, and
    wherein the moving speed changing device decreases the speed of the braking member with a decrease in the speed of the vehicle detected by the operation state detecting device.

4. A vehicular brake control apparatus according to claim 1,
    wherein the operation state detecting device detects a parking brake command signal for actuating a parking brake of the vehicle, and
    wherein the moving speed changing device sets the speed of the braking member based on a command signal other than the parking brake command signal lower when the parking brake command signal is detected, than the speed set when the parking brake command signal is not detected.

5. A vehicular brake control apparatus according to claim 1,
    wherein the operation state detecting device detects whether there is a state of braking in which emergency braking is to be performed with respect to the vehicle, and
    wherein if it is detected that the state of braking in which emergency braking is to be performed exists, the moving speed changing device sets the speed of the braking member greater than the speed set during a state of braking other than the emergency braking.

6. A vehicular brake control apparatus according to claim 2, further comprising a position detecting device that detects a position of the braking member; wherein until the braking member reaches a target reference position, the actuator control device controls a current for causing the electric actuator to move the braking member by feeding back a present position of the braking member detected by the position detecting device.

7. A vehicular brake control apparatus according to claim 2, further comprising an-actual braking torque detecting device that detects an actual braking torque applied to the wheel,
    wherein the operation state detecting device includes a brake operation amount detecting device that detects an amount of brake operation performed by the operating person, and wherein the actuator control device determines a target braking torque based on the amount of brake operation detected by the brake operation amount detecting device, and determines the current to be supplied to the electric actuator in accordance with the target braking torque, and changes the determined current to be supplied to the electric actuator so that the actual braking torque detected by the actual braking torque detecting device becomes equal to the determined target braking torque by feeding back the actual braking torque detected, and wherein the moving speed changing device changes at least one of the target braking torque determined based on the amount of brake operation detected by the brake operation amount detecting device and the current to be supplied to the electric actuator that is determined in accordance with the target braking torque so that the speed of the braking member moving toward the braked member is changed in accordance with the state of operation detected by the operation state detecting device.

8. A vehicular brake control apparatus according to claim 6, further comprising an actual braking torque detecting device that detects an actual braking torque applied to the wheel, wherein the operation state detecting device includes a brake operation amount detecting device that detects an amount of brake operation performed by the operating person, and wherein the moving speed changing device determines a target braking torque based on the amount of brake operation detected by the brake operation amount detecting device, and determines a current to be supplied to the electric actuator in accordance with the target braking torque, and changes the determined current to be supplied to the electric actuator so that the actual braking torque detected by the actual braking torque detecting device becomes equal to the target braking torque, by feeding back the actual braking torque detected by the actual braking torque detecting device, and wherein the vehicular brake control apparatus further comprises a switching device that switches from a feedback control based on the position of the braking member to a feedback control based on the actual braking torque detected by the actual braking torque detecting device when the braking member reaches the target position, and wherein in the feedback control based on the position of the braking member, the moving speed changing device controls the current for causing the electric actuator to move the braking member so that the moving speed of the braking member decreases as the braking member approaches the braked member.

9. A vehicular brake control apparatus comprising a braked member that rotates together with a wheel;

a braking member disposed so as to have a clearance with respect to the braked member;

an electric actuator that generates a force in accordance with a current supplied thereto and that, by the force generated, moves the braking member into contact with the braked member and then presses the braking member against the braked member;

a brake operation amount detecting device that detects an amount of brake operation performed by an operating person;

an actual braking torque detecting device that detects an actual braking torque applied to the wheel;

a current control device that determines a target braking torque based on the amount of brake operation detected, and that determines a current to be supplied to the electric actuator in accordance with the target braking torque, and that changes the determined current to be supplied to the electric actuator so that the actual braking torque detected by the actual braking torque detecting device becomes equal to the determined target braking torque by feeding back the actual braking torque detected by the actual braking torque detecting device;

an operation state detecting device that detects a state of operation of the vehicle; and a moving speed changing device that changes at least one of the target braking torque determined based on the amount of brake operation detected by the brake operation amount detecting device and the current to be supplied to the electric actuator that is determined in accordance with the target braking torque so that a speed of the braking member moving toward the braked member is changed in accordance with the state of operation detected by the operation state detecting device, wherein the vehicular brake control apparatus controls the braking torque applied to the wheel by controlling the electric actuator.

10. A vehicular brake control apparatus comprising:

a braked member that rotates together with a wheel;

a braking member disposed so as to have a clearance with respect to the braked member;

an electric actuator that generates a force in accordance with a current supplied thereto and that, by the force generated, moves the braking member into contact with the braked member and then presses the braking member against the braked member;

a device for detecting a position of the braking member;

a current control device that controls a current through the electric actuator in accordance with the position detected by the device;

an operation state detecting device that detects a state of operation of the vehicle; and a moving speed changing device that changes the current through the electric actuator so that a speed of the braking member moving toward the braked member is changed in accordance with the state of operation detected by the operation state detecting device, wherein the vehicular brake control apparatus controls a braking torque applied to the wheel by controlling the electric actuator.

11. A control method for a vehicular brake control apparatus having a braked member that rotates together with a wheel, a braking member disposed so as to have a clearance with respect to the braked member, and an actuator that moves the braking member into contact with the braked member and then generates a force for pressing the braking member against the braked member, the method comprising the steps of:

determining a operating state of a vehicle; and changing a moving speed of the braking member moving toward the braked member in accordance with the state of the vehicle.

12. A control method for the vehicular brake control apparatus, according to claim 11, wherein the actuator is an electric actuator, and wherein in the step of determining the operating state of vehicle, a speed of the vehicle is detected, and wherein in the step of changing the moving speed of the braking member, the moving speed of the braking member is decreased with a decrease in the speed of the vehicle.

13. A control method for the vehicular brake control apparatus, according to claim 11, wherein in the step of determining the operating state of the vehicle, it is determined whether a parking brake is in an actuated state, and wherein in the step of changing the moving speed of the braking member, the moving speed of the braking-member based on a braking operation other than a braking operation of the parking brake is set lower when the parking brake is in the actuated state than the speed set when the parking brake is not in the actuated state.

14. A control method for the vehicular brake control apparatus, according to claim 13, wherein in the step of determining the operating state of the vehicle, a speed of the vehicle is detected, and wherein in the step of changing the moving speed of the braking member, if the speed of the vehicle is larger than a predetermined value and the parking brake is in the actuated state, a higher priority is given to a control of increasing the moving speed of the braking member based on the speed of the vehicle than to a control of decreasing the moving speed of the braking member based on a braking operation other than the braking operation of the parking brake.

15. A control method of the vehicular brake control apparatus, according to claim 11, wherein the actuator is an electric actuator, and wherein in the step of determining the operating state of the vehicle, it is detected whether there is a state of braking in which emergency braking is to be performed with respect to the vehicle, and wherein in the step of changing the moving speed of the braking member, the moving speed of the braking member is set lower when the parking brake is in the actuated state than the speed set during a braking operation other than a braking operation of the parking brake.

16. A control method for the vehicular brake control apparatus, according to claim 11, wherein the step of determining an operating state of the vehicle includes detecting an amount of brake operation performed by an operating person, and wherein the control method further comprising the steps of:

detecting an actual braking torque applied to the wheel;

determining a target braking torque based on the amount of brake operation detected;

determining a current to be supplied to the electric actuator in accordance with the target braking torque;

changing the determined current to be supplied to the electric actuator so that the actual braking torque detected becomes equal to the target braking torque determined, by feeding back the actual braking torque detected; and changing at least one of the target braking torque determined based on the amount of brake operation detected and the current to be supplied to the electric actuator that is determined in accordance with the target braking torque so that the speed of the braking member moving toward the braked member is changed in accordance with the state of operation detected.

17. A control method for the vehicular brake control apparatus, according to claim 11, further comprising the steps of:

detecting a position of the braking member;

controlling a current through the electric actuator in accordance with the position detected; and changing the current through the electric actuator so that the speed of the braking member moving toward the braked member is changed in accordance with the state of operation detected.

18. A control method for the vehicular brake control apparatus, according to claim 17, wherein the step of determining an operating state of operation of the vehicle includes detecting an amount of brake operation performed by the operating person, and wherein the control method further comprising the steps of:

detecting an actual braking torque applied to the wheel;

determining a target braking torque based on the amount of brake operation detected;

determining the current to be supplied to the electric actuator in accordance with the target braking torque;

changing the determined current to be supplied to the electric actuator so that the actual braking torque detected becomes equal to the determined target braking torque determined, by feeding back the actual braking torque detected;

changing at least one of the target braking torque determined based on the amount of brake operation detected and the determined current to be supplied to the electric actuator that is determined in accordance with the target braking torque so that the speed of the braking member moving toward the braked member is changed in accordance with the state of operation detected; and switching to a control based on a feedback of the actual braking torque detected, if in the step of detecting the position of the braking member it is determined that the braking member is not apart from the braked member.

19. A vehicular brake control apparatus comprising:

a braking member disposed so as to have a clearance with respect to a braked member that rotates together with a wheel;

an actuator that moves the braking member into contact with the braked member and then generates a force for pressing the braking member against the braked member; and actuator control means for controlling the force generated by the actuator based on a brake operation performed by an operating person, operation state detecting means for detecting a state of operation of a vehicle; and moving speed changing means for changing a control performed by the actuator control means so that a speed of the braking member moving toward the braked member is changed in accordance with the state of operation detected by the operation state detecting means.

* * * * *